Patented May 21, 1940

2,201,419

UNITED STATES PATENT OFFICE 2,201,419

PROCESS OF TREATING IMPURE SUCROSE BEARING MATERIALS

William H. Young, Burlingame, Calif.

No Drawing. Application March 16, 1938,
Serial No. 196,217

6 Claims. (Cl. 127—46)

The present invention relates to the recovery of sucrose from materials wherein, in addition to the sucrose content, there are impurities preventing the crystallization of the sucrose, which is the only commercially practical manner of isolating and capturing the sucrose. More particularly it relates to the method of recovering the sucrose ordinarily lost in the press cake by prior methods.

Therefore, it is the object of the present invention to recover the sucrose remaining in the filter cake, and so increase the total sucrose recovery as well as bring up the percentage of recovery to commercial requirements.

It is likewise an object of the invention to provide a method of recovery so that the sucrose retrieved may be added to the mother liquor or purified sucrose solutions of the main process for processing without lowering the purity thereof.

Also it is an object to provide a method of treatment whereby losses of sucrose occasioned by filtration are eliminated.

It is well known that molasses coming from a plantation raw sugar manufacture or from a sugar refinery or any other source of impure sucrose solutions contain sucrose, glucose, organic non-sugars, ash and moisture. The presence of the impurities, particularly the glucose and organic non-sugars prevent the crystallization of the sucrose. Hence these must be removed before there can be a commercial isolation and recovery of the sucrose. In ridding the treated material of impurities the principal difficulty has been in the removal of the glucose in such a manner as not to affect the sucrose, as the other impurities are comparatively readily removed.

The problem has been attacked by investigators such as Olivarius to the end that the glucose content is converted into alcohol and carbon dioxide gas by fermentation set up by inoculation of the treated material with yeasts, and the subsequent precipitation of the other impurities by the addition of lime solution or solutions of other alkaline earth oxides or hydroxides.

Alcohol is likewise used principally for two reasons: first, to stop the fermentation, and second, to have the lime reaction take place in the presence of alcohol as an aid thereto. The reaction brings about a substantial and well defined precipitation of impurities which remain in the press cake after separation from the alcohol and sucrose solution by filtration. Tests have proved that a substantial amount of sucrose remains behind in the press cake and may run anywhere from 5% to 20% of the total sucrose recovery depending upon the operating conditions and the effectiveness of the reactions.

The amount of the press cake is a substantial factor. In some operations for the recovery of sucrose from impure sucrose solutions, such as molasses, the amount of press cake produced amounts to about 25% (dry basis) of the weight of the original molasses treated. Obviously, in addition to the impurities precipitated, there is a considerable quantity of sucrose remaining in the press cake after filtration.

In the various efforts to recover the sucrose remaining in the press cake it has been the practice to wash the cakes with a solution of approximately 50% water and 50% alcohol. In washing the cakes with this 50% alcohol solution, a portion of the impurities soluble in alcohol are carried with the sucrose and a portion of the impurities soluble in water are likewise carried along with the sucrose. Consequently, when the washings were added to the filtrate, a substantial drop in purity was experienced. The same is substantially true where the washing is with water or alcohol alone. For example, where Louisiana waste molasses was treated with the old methods before adding the press cake washings, the filtrate had a purity of about 65 degrees. When the washings were added to this filtrate, the purity of the combined filtrate and washings had dropped to approximately 60 degrees, thus resulting in a considerable loss of recoverable sucrose. It is calculated that there is a loss of about 15 to 20 pounds per ton per degree of drop in purity, which is a considerable loss when the volume of treated materials passing through in normal plant operation is considered.

In accordance with the disclosures herein, the problem of recovering the sucrose in the press cake and so increasing the percentage of recovery without a re-contamination with impurities and the consequent lowering of the purity of the filtrate has been solved by paralleling or approximating the conditions of the mother liquor or the filtrate. It was found that the 50% alcohol solution acted as a solvent for certain of the impurities in the press cake, particularly those which were soluble in a slightly alcoholic solution. In order to recover the residual sucrose, the press cake is washed and the wash for the press cake adjusted to approximate the conditions of the mother liquor or the filtrate by adding a small amount of milk of lime or other solution of an alkaline earth oxide or hydroxide. Usually 1% by volume of milk of lime will be sufficient but enough solution must be added to bring the alkalinity of the wash to approximate that of the mother liquor or the filtrate. When so adjusted, the wash solution after being run through the filter press cake is a pure solution of alcohol, sucrose and water. None of the impurities in the press cake are soluble in such adjusted washing solution with the result that the press cake washings come from the filter presses with substantially the same purity as the filtrate. This solution being substantially the same in character as the filtrate and substantially the same in degree of purity may be added to the filtrate without contamination and without lowering the purity. With the increase in the degree of purity, the increase of sucrose crystallization and recovery is greatly enhanced. With the rise in purity the increase in sucrose recovery may be as much as 10% to 25%. Thus the percentage of sucrose which may be recovered and crystallized is brought up to commercially practical operating requirements.

There is in most of the recovery processes a second filtration principally after the alcohol is removed from the clarified and purified sucrose solution. Here again the precipitate which remains as residue after decantation or as press cake after filtration contains residual recoverable sucrose, although not to the extent of the first separation. Precisely the same wash solution as before described may be used to recover the sucrose, and the resulting solution may be returned and added to the main solution without contamination or lowering of purity. Here again there is an increase in the recoverable sucrose.

Although this method of adjusting the wash of the press cake finds particular usefulness in the various so-called Olivarius processes it is to be understood that the invention is of much wider application and refers to all processes where filtration of sucrose or precipitation of impurities from a sucrose solution is employed.

I claim:

1. In the method of recovering sucrose from impure solutions where alcohol and an alkaline earth oxide or hydroxide are used to precipitate the impurities, the step of treating the press cake remaining after filtration for the recovery of residual sucrose by washing the press cake with a solution of alcohol and water adjusted to the alkalinity of the treated mother liquor prior to filtration by the addition of a small amount of an alkaline earth oxide or hydroxide.

2. In the method of recovering sucrose from impure solutions where alcohol and an alkaline earth oxide or hydroxide are used to precipitate the impurities, the steps of treating the press cake remaining after the filtration of the treated liquid for the recovery of residual sucrose by washing the press cake with a 50% solution of alcohol and 1% by volume of milk of lime and adding the washings to the filtrate.

3. In the production of sucrose the method of recovering residual sucrose remaining in the press cake after filtration so that the sucrose so retrieved may be added to the filtrate without lowering the purity thereof, including the steps of washing the press cake with a 50% solution of alcohol and 1% by volume of milk of lime and adding the washings to the filtrate.

4. In the method of recovering sucrose from impure solutions where alcohol and an alkaline earth oxide or hydroxide are used to precipitate the impurities, the steps of treating the press cake for the recovery of residual sucrose so that the sucrose retrieved therefrom may be added to the filtrate without lowering the purity thereof by washing the press cake remaining after filtration of the impurities with a solution of alcohol and water adjusted to the alkalinity of the purified filtrate by the addition of a small amount of an alkaline earth oxide or hydroxide and adding the washings to the filtrate.

5. In the production of sucrose the method of recovering residual sucrose remaining in the press cake after filtration of the precipitated impurities comprising the step of washing the press cake with a solution of alcohol and an alkaline earth oxide or hydroxide, said alkaline earth oxide or hydroxide being present only in sufficient quantities to produce a resulting wash solution of substantially the same characteristics and purity as the filtrate and adding the resulting washings to the filtrate.

6. In the production of sucrose the method of recovering residual sucrose remaining in the press cake after filtration of the precipitated impurities comprising the step of washing the press cake with a solution of alcohol and an alkaline earth oxide or hydroxide, said alkaline earth oxide or hydroxide being present only in sufficient quantities to produce a washing solution of substantially the same characteristics as the filtrate and without re-contamination with precipitated impurities and adding the resulting washings to the filtrate.

WILLIAM H. YOUNG.